United States Patent [19]

Greaves

[11] Patent Number: 4,565,393

[45] Date of Patent: Jan. 21, 1986

[54] PIPE JOINT

[75] Inventor: Gerald G. Greaves, Wichita Falls, Tex.

[73] Assignee: Ameron Inc., Monterey Park, Calif.

[21] Appl. No.: 439,440

[22] Filed: Nov. 5, 1982

[51] Int. Cl.$^4$ .............................................. F16L 17/02
[52] U.S. Cl. .................................... 285/107; 285/15; 285/302; 285/347; 285/353; 285/369; 285/423; 285/DIG. 16
[58] Field of Search ................. 285/DIG. 16, 423, 15, 285/347, 369, 356, DIG. 7, 353, 302, 107, 108

[56] References Cited

U.S. PATENT DOCUMENTS

| | | |
|---|---|---|
| 1,302,778 | 5/1919 | Drewry . |
| 1,391,456 | 9/1921 | Broschart . |
| 1,617,776 | 2/1927 | Taylor . |
| 2,294,160 | 8/1942 | Crane et al. ................... 285/423 X |
| 2,301,280 | 11/1942 | Howe . |
| 3,223,438 | 12/1965 | DeCenzo ...................... 285/369 X |
| 3,236,543 | 2/1966 | Mueller ................................ 285/2 |
| 3,381,980 | 5/1968 | Smith ................................ 285/109 |
| 3,711,126 | 1/1973 | Hara et al. ......................... 285/116 |
| 3,860,742 | 1/1975 | Medney ................................ 174/84 |
| 4,013,309 | 3/1977 | Quick ................................. 285/31 |
| 4,014,568 | 3/1977 | Carter et al. ............. 285/DIG. 16 |
| 4,035,002 | 7/1977 | Curtin .................................. 285/31 |
| 4,067,534 | 1/1978 | Frey .................................. 285/319 |
| 4,093,279 | 6/1978 | Verdesca et al. ..................... 285/23 |
| 4,109,941 | 8/1978 | Wood et al. ......................... 285/111 |

FOREIGN PATENT DOCUMENTS

| | | |
|---|---|---|
| 777859 | 6/1957 | United Kingdom . |
| 7980450 | 7/1979 | United Kingdom ............... 285/423 |
| 289241 | 12/1970 | U.S.S.R. . |

*Primary Examiner*—Dave W. Arola
*Attorney, Agent, or Firm*—Shapiro and Shapiro

[57] ABSTRACT

A telescoping joint for plastic pipe comprises a pair of sleeve members bonded to adjacent ends of a pair of pipe sections, a tubular body member into opposite ends of which sleeve members telescope, with O-ring seals carried by the sleeve members forming a seal against the inner surface of the body member, and tubular adaptor members which fit on the respective pipe sections adjacent the sleeve members and thread into opposite ends of the body member to provide thrust restraint precluding withdrawal of the sleeve members and the pipe sections therefrom. The joint may be used for in situ repairs of fractured pipe, or may be supplied with pipe sections bonded-in, for use in a telescoping joint or union to be coupled into a pipe line.

6 Claims, 1 Drawing Figure

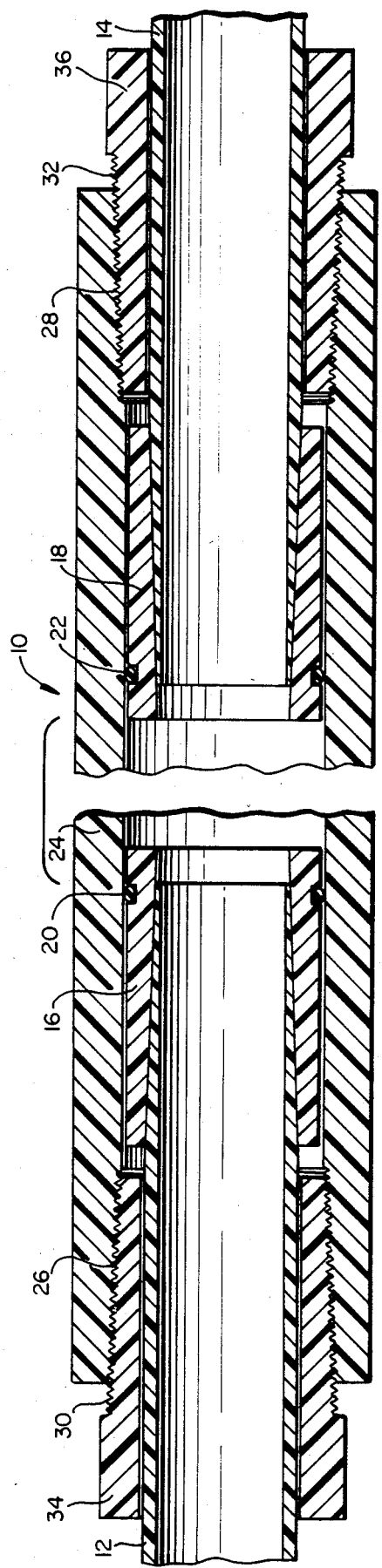

PIPE JOINT

BACKGROUND OF THE INVENTION

This invention relates to a pipe joint which finds particular application as a repair coupling in non-metallic plastic pipe systems, but which may also be used to advantage in other applications, for example as a union between pipe sections of an originating pipe layout.

The need for a reliable repair coupling for fiberglass-reinforced thermosetting resin pipe has been long felt. One basic problem is that in a run of pipe it may not be possible for the sections adjacent a fracture easily to be moved back to allow insertion of a joint. The present invention provides, inter alia, a coupling which can telescope, thereby providing a facility whereby it may be used to form a joint between adjacent pipe sections without the need to provide substantial movement of the sections in order to install the coupling and make the joint.

SUMMARY OF THE INVENTION

Broadly stated, the invention provides in one of its aspects, means for providing a joint between adjacent sections of non-metallic pipe (particularly fiber-reinforced thermosetting resin pipe) comprising a pair of tubular sleeve members adapted to be bonded to the respective ends of the pipe sections, an external peripheral seal member carried by each sleeve member, a tubular body member into opposite ends of which the respective sleeve members are adapted to telescope, with the seal members sealingly engaging the inner surface of said body member, and externally threaded adaptor members adapted to fit on the respective pipe sections adjacent said sleeve members for threaded engagement with threads formed on the opposite ends of the body member so as to provide thrust restraint precluding withdrawal of the sleeve members from the body member.

In accordance with a further and independent aspect of the invention, in means providing a joint between adjacent sections of non-metallic pipe as aforesaid, at least one of the sleeve members may have a greater tendency to expand in response to increases in internal pipe pressure than the body member, whereby a seal between said members may be tightened in response to such increases in pressure.

Additional features and advantages of the invention will be apparent from the ensuing description and claims read in conjunction with the accompanying drawing.

BRIEF DESCRIPTION OF DRAWING

The single drawing FIGURE is a longitudinal section through an exemplary form of pipe joint made in accordance with the invention.

DESCRIPTION OF PREFERRED EMBODIMENT

The drawing illustrates, by way of example only, one form of pipe joint 10 in accordance with the invention, for connecting adjacent sections 12 and 14 of plastic pipe, which may comprise high-pressure fiber-reinforced thermosetting resin pipe.

Joint 10 includes a pair of plastic sleeve members 16 and 18, which may also be of fiber-reinforced thermosetting resin, and which are internally tapered and bounded (by any suitable bonding means known in the art) to correspondingly tapered end portions of the respective pipe sections. Sleeve members 16 and 18 have non-tapered outer surfaces, each formed adjacent one end, with a groove receiving a seal member comprising an O-ring seal 20, 22 of rubber or like sealing material. The location of the groove and seal is, in each case, preferably such as to align the seal substantially with the end (i.e., extremity) of the respective pipe section where the thickness of the pipe wall is at its smallest.

Joint 10 further includes an outer tubular body member 24, which may be of fiber-reinforced resin wound on a mandel or the like to provide a smooth inner surface, the diameter of which is such that sleeve members 16 and 18 may telescope into and out of opposite ends of the body member 24, with seals 20 and 22 sealingly engaging portions of its inner surface disposed inwardly from the ends. The opposite end portions of body member 24 have internal tapered threads 26, 28 for receiving complementary external tapered threads 30, 32 formed on tubular adaptor members 34, 36, which are slidingly received on the respective pipe sections 12 and 14 adjacent sleeve members 16 and 18. Adaptor members 34 and 36 which may also be made of fiber-reinforced plastic, provide thrust restraint for the joint when threaded into the body member, precluding withdrawal of the sleeve members 16 and 18 therefrom.

According to an important feature of the invention, sleeve members 16 and 18 may have a greater tendency (at least in the regions of seals 20, 22) than body member 24 to expand in response to increases in internal pipe pressure, so that as internal pipe pressure increases, seals 20 and 22 may be pressed into tighter engagement with the inner surface of the body member to enhance the sealing effect. For example, body member 24 may have a greater stiffness than the sleeve members, thereby having a greater resistance to expansion. Factors contributing towards the required expansion differential may for example include; a differential in wall thickness between the sleeve members and body member; the positioning of the seals at the ends of the pipe sections where the pipe wall thickness is at its smallest; and the use of different materials or different manufacturing techniques for the sleeve members and the body member. For example, the sleeve members and body member may have fiber-reinforcement of different orientation. Thus, the fibers in both the sleeve members and the body member may be wound predominantly at about 54°, with the body member also including some 90° windings to increase its stiffness. Alternatively, the body member may include wound reinforcement, while the sleeve members may be centrifugally cast, in known manner, with chopped-fiber reinforcement. In all cases, differential expansion of the sleeve members and body member may be adapted to increase the sealing effect of the joint with internal pipe pressure increases, so as to make the joint suitable for withstanding high internal pipe pressures of up to, or exceeding 5,000 psi.

A joint as described and illustrated may be used to provide in situ repair of a fractured pipe, for example, by cutting away the fractured pipe portion, suitably tapering the adjacent pipe section ends (to take sleeve members 16 and 18), freely sliding the adaptor members 34, 36 onto the respective pipe sections, bonding on the sleeve members, telescoping body member 24, over one of the sleeve members along the one pipe section (it may be necessary to somewhat misalign the pipe sections to accommodate this), moving the body member back into place over the other sleeve member and, finally, threading the adaptor members into place.

The illustrated joint may also be supplied in pre-assembled form with lengths of pipe constituting pipe sections 12 and 14 already bounded-in as shown in the drawing. This arrangement provides a convenient telescoping joint which may, for example, be inserted into line pipe by means of additional couplings or the like at the outer ends of the respective pipe sections 12 and 14.

Additionally, since the joint does not require rotation of a pipe section for its installation, it may also be used to good effect as a union in the originating installation of a pipe layout. In this capacity the joint allows a pipe to be layed from opposite ends towards the center, with the subject joint forming in the final connection. The joint also allows tee-sections and the like to be inserted in existing line pipe, and its ability, in use, to accommodate relative movement of the pipe sections and body member makes it suitable for use as an expansion joint. The joint may be made in different sizes, and is considered particularly suitable for pipes in the 2 inch to 4 inch diameter range, though these dimensions are not deemed limiting.

It will be appreciated from the foregoing that the invention provides a pipe joint suitable for diverse applications particularly in the field of fiber-reinforced plastic pipe systems. The subject joint has relatively simple design, manufacture, and installation characteristics and may be used to good effect to withstand internal pipe pressure.

While only a preferred embodiment of the invention has been described herein in detail, the invention is not limited thereby and modifications may be made within the scope of the attached claims. For example, while body member 24 is illustrated as being rectilinear, it may also be curved, as in an elbow fitting or branched, as in a tee.

I claim:

1. A combination for providing a joint between two adjacent sections of a plastic pipe, comprising a pair of tubular sleeve members adapted to be bonded to adjacent ends of the respective pipe sections, a pair of externally threaded adaptor members constructed to fit on the respective pipe sections rearward from and adjacent to said sleeve members, a pair of seal members each configured to be placed about and carried on the external periphery of a corresponding one of said sleeve members, and a tubular body member with opposite ends constructed for telescopically receiving the respective sleeve members with the corresponding seal members carried thereon, said opposite ends having internally threaded portions for threaded engagement with the respective adaptor members, said body member further including internal surface portions disposed inwardly from said opposite ends and configured for sealing engagement with the respective seal members during telescopic movement of the sleeve members within said body member, and wherein the sleeve members and body member comprise wound fiber-reinforced thermosetting resin components, with the body member having fibers of different fiber winding orientation from the fibers of the sleeve members to permit the sleeve members to expand relative to the body member in response to increases in internal pipe pressure.

2. A combination for providing a joint between two adjacent sections of a plastic pipe, comprising a pair of tubular sleeve members adapted to be bonded to adjacent ends of the respective pipe sections, a pair of externally threaded adaptor members constructed to fit on the respective pipe sections rearward from and adjacent to said sleeve members, a pair of seal members each configured to be placed about and carried on the external periphery of a corresponding one of said sleeve members, and a tubular body member with opposite ends constructed for telescopically receiving the respective sleeve members with the corresponding seal members carried thereon, said opposite ends having internally threaded portion for threaded engagement with the respective adaptor means, said body member further including internal surface portions disposed inwardly from said opposite ends and configured for sealing engagement with the respective seal members during telescopic movement of the sleeve members within said body member, and wherein the body member comprises a wound fiber-reinforced thermosetting resin component and the sleeve members comprise centrifugally cast fiber-reinforced thermosetting resin components which tend to expand more than said body member in response to increases in internal pipe pressure.

3. A telescoping plastic pipe joint comprising a pair of sleeve members secured respectively to adjacent ends of a pair of plastic pipe sections, an external peripheral seal member carried by each of said sleeve members, a tubular body member having telescopically received via its opposite ends the respective sleeve members with the corresponding seal members sealingly engaging portions of the internal surface of the body member during telescopic movement of the sleeve members therein, and a pair of externally threaded adaptor members slidingly disposed on the respective pipe sections adjacent the sleeve members for threaded engagement with internal threads formed at said opposite ends of the body member, respectively, so as to provide thrust restraint precluding withdrawal of the sleeve members and pipe sections from the body member, and wherein the sleeve members and body member comprise wound fiber-reinforced thermosetting resin components, with the body member including fibers having a different fiber winding orientation from the fibers in the sleeve members to permit the sleeve members to expand relative to the body member in response to increases in internal pipe pressure.

4. A telescoping plastic pipe joint comprising a pair of sleeve members secured respectively to adjacent ends of a pair of plastic pipe sections, an external peripheral seal member carried by each of said sleeve members, a tubular body member having telescopically received via its opposite ends the respective sleeve members with the corrresponding seal members sealingly engaging portions of the internal surface of the body member during telescopic movement of the sleeve members therein, and a pair of externally threaded adaptor members slidingly disposed on the respective pipe sections adjacent the sleeve members for threaded engagement with internal threads formed at said opposite ends of the body member, respectively, so as to provide thrust restraint precluding withdrawal of the sleeve members and pipe sections from the body member, and wherein the body member comprises a wound fiber-reinforced thermosetting resin component and the sleeve members comprise centrifugally cast fiber-reinforced thermosetting resin components having a greater tendency than said body member to expand upon increases in internal pipe pressure.

5. In a plastic pipe joint comprising a sleeve member secured to the end of a pipe section, a tubular body member surrounding said sleeve member, and a seal member disposed intermediate the sleeve member and the body member, the seal member being in engagement with the outer surface of the sleeve member and the inner surface of the body member for providing a peripheral seal therebetween, the improvement wherein the sleeve member and the body member comprise wound fiber-reinforced thermosetting resin components, with the sleeve member including fibers having a different winding orientation from the fibers of the body member for permitting the sleeve member to expand relative to the body member in response to increases in internal pipe pressure, so that the seal member is pressed into tighter engagement with said inner and outer surfaces to tighten said peripheral seal.

6. In a plastic pipe joint comprising a sleeve member secured to the end of a pipe section, a tubular body member surrounding said sleeve member, and a seal member disposed intermediate the sleeve member and the body member, the seal member being in engagement with the outer surface of the sleeve member and the inner surface of the body member for providing a peripheral seal therebetween, the improvement wherein the body member comprises a wound fiber-reinforced thermosetting resin component and wherein the sleeve member comprises a centrifugally cast fiber-reinforced thermosetting resin component with a greater tendency than said body member to expand in response to increases in internal pipe pressure for pressing the seal member into tighter engagement with said inner and outer surfaces to tighten said peripheral seal.

* * * * *

UNITED STATES PATENT AND TRADEMARK OFFICE
CERTIFICATE OF CORRECTION

PATENT NO. : 4,565,393
DATED : January 21, 1986
INVENTOR(S) : GERALD G. GREAVES

It is certified that error appears in the above-identified patent and that said Letters Patent are hereby corrected as shown below:

Col. 3, line 5, change "bounded-in" to -- bonded-in --

Col. 3, line 15, delete "in"

Col. 4, line 10 (Claim 2, line 15), change "portion" to -- portions --

Col. 4, line 11 (Claim 2, line 16), change "means" to -- members --

Signed and Sealed this

Twenty-second Day of July 1986

[SEAL]

Attest:

Attesting Officer

DONALD J. QUIGG

Commissioner of Patents and Trademarks